(12) United States Patent
Ayon et al.

(10) Patent No.: US 9,714,875 B2
(45) Date of Patent: Jul. 25, 2017

(54) IMPACT-RESISTANT SURFACE-MOUNTED ROOF SENSORS

(71) Applicant: BOARD OF REGENTS OF THE UNIVERSITY OF TEXAS SYSTEM, Austin, TX (US)

(72) Inventors: Arturo A. Ayon, San Antonio, TX (US); Cory Hallam, San Anotnio, TX (US); Dylan Ginn, San Antonio, TX (US)

( * ) Notice: Subject to any disclaimer, the term of this patent is extended or adjusted under 35 U.S.C. 154(b) by 0 days.

(21) Appl. No.: 14/345,831

(22) PCT Filed: Sep. 19, 2012

(86) PCT No.: PCT/US2012/056117
§ 371 (c)(1),
(2) Date: Mar. 19, 2014

(87) PCT Pub. No.: WO2013/043724
PCT Pub. Date: Mar. 28, 2013

(65) Prior Publication Data
US 2014/0230574 A1 Aug. 21, 2014

Related U.S. Application Data

(60) Provisional application No. 61/536,425, filed on Sep. 19, 2011.

(51) Int. Cl.
| | |
|---|---|
| G01L 1/10 | (2006.01) |
| G01L 1/16 | (2006.01) |
| G01M 5/00 | (2006.01) |
| G01L 1/26 | (2006.01) |
| E04D 13/00 | (2006.01) |

(52) U.S. Cl.
CPC .............. *G01L 1/16* (2013.01); *E04D 13/00* (2013.01); *G01L 1/26* (2013.01); *G01M 5/0041* (2013.01)

(58) Field of Classification Search
CPC . G01L 1/16; G01L 1/26; E04D 13/00; G01M 5/0041
USPC ................... 73/12, 9, 12.13, 862.625, 12.09
See application file for complete search history.

(56) References Cited

U.S. PATENT DOCUMENTS

| | | | |
|---|---|---|---|
| 4,686,764 A | | 8/1987 | Adams et al. |
| 4,993,506 A | * | 2/1991 | Angel ........................... 177/211 |
| 5,419,549 A | * | 5/1995 | Galloway et al. ............ 473/431 |
| 6,021,863 A | * | 2/2000 | Stanley ......................... 180/273 |
| 6,415,044 B1 | * | 7/2002 | Simpson et al. .............. 382/108 |
| 7,562,575 B2 | * | 7/2009 | Hatano et al. .................. 73/526 |
| 7,862,045 B2 | * | 1/2011 | Hodge ........................... 273/371 |

(Continued)

FOREIGN PATENT DOCUMENTS

JP 2574197 Y2 6/1998

*Primary Examiner* — Max Noori
(74) *Attorney, Agent, or Firm* — Jackson Walker LLP

(57) ABSTRACT

Various systems and techniques may be used to enhance the sensing loads on a roof surface. In some implementations, an impact-resistant surface-mounted roof sensor system may include a sensor, a protective cover, and a load transfer mechanism. The sensor may be adapted to sense a load incident thereon, and the protective cover may be configured to span at least the width of the sensor and adapted to withstand impacts from dense media and an direct incident load. The load transfer mechanism may be adapted to mechanically transfer a load applied on the protective cover to the sensor.

12 Claims, 5 Drawing Sheets

(56) References Cited

U.S. PATENT DOCUMENTS

| | | | |
|---|---|---|---|
| 2008/0314136 A1 | 12/2008 | Silverbrook et al. | |
| 2009/0326835 A1* | 12/2009 | Housen | G01L 5/0052 |
| | | | 702/41 |
| 2011/0308318 A1* | 12/2011 | Magnussen | G01J 1/0492 |
| | | | 73/649 |
| 2016/0369861 A1* | 12/2016 | Phipps | B60R 19/28 |
| 2017/0059286 A1* | 3/2017 | D'Andrade | F41J 5/14 |

* cited by examiner

IMPACT-RESISTANT SURFACE-MOUNTED ROOF SENSORS

CROSS REFERENCE TO RELATED APPLICATIONS

This application claims the benefit of, priority from, and incorporates herein by reference U.S. Provisional Application 61/536,425, filed Sep. 19, 2011, and entitled "Impact-Resistant Surface-Mounted Sensors."

BACKGROUND OF THE INVENTION

This specification relates to the field of mechanical sensors, and more particularly to impact-resistant roof sensors.

A static structure (e.g., a building) can experience loading, particularly on its roof, in the presence of wind, rain, snow, ice, and other environmental factors. In some cases, loading can become so severe that catastrophic failure of the roof can occur, which can cause substantial damage to the property therein, not to mention people.

Various systems exist to measure roof conditions. Some systems measure leaks through a roof as a metric for roof condition. Other systems measure the load on a roof. Load measurement systems are typically mounted inside the building. For example, some interior systems consist of measurement devices mounted on interior building supports. As another example, some interior systems use optical techniques (e.g. with interrupted laser beams under the roof) to measure roof deformation.

SUMMARY OF THE INVENTION

In one general implementation, an impact-resistant surface-mounted roof sensor system may include a sensor, a protective cover, and a load transfer mechanism. The sensor may be adapted to sense a load incident thereon, and the protective cover may be configured to span at least the width of the sensor and adapted to withstand impacts from dense media and a direct incident load. The load transfer mechanism may be adapted to mechanically transfer a load applied on the protective cover to the sensor.

Various implementations may have one or more features. For example, a roof-mounted sensor system may be adapted to protect itself from impacts, such as from hail. Thus, the sensor system may be relatively durable. As another example, a sensor system may be adapted to prevent bridging by lightly-packed media. Thus, the sensor system may be more accurate in a wider range of conditions.

Other features will be apparent to those skilled in the art based on the following description and the accompanying figures.

DETAILED DESCRIPTION

Surface-mounted roof load sensors may suffer performance degradation from a variety of environmental factors. For example, surface-mounted roof load sensors may be rendered ineffective due to bridging of the sensor by accumulated media (e.g., snow and/or ice) on the roof. As another example, surface-mounted roof load sensors may be damaged by dense media.

Bridging often occurs when friction between media molecules (e.g., snow and/or ice) surrounding each other tend to hold up or support each other and create an underlying area that the media does not fully contact. For snow, bridging is a function of several variables, including humidity, air temperature, and type and size of snowflakes. Bridging can lead to an uneven distribution of load on a surface such as a roof. Sensors on such a surface may record inaccurate measurements for the incident load, which may lead to underestimating the magnitude of the load. This problem is particularly prevalent with lightly packed media, such as sand or snow. Bridging can also occur with other weather conditions or media (e.g., roofing debris, tree parts, etc.) on a roof.

Falling media (e.g., hailstones) can damage surface-mounted roof sensors. This can lead to a sensor becoming unavailable at a time when its function may be particularly important—during a storm.

The pressure of a hailstone impact can generally be characterized in terms of the force of the impact (F) and the impact surface area of the hailstone (A), according to Equation 1.

$$P = \frac{F}{A} \quad (1)$$

Figure 5:
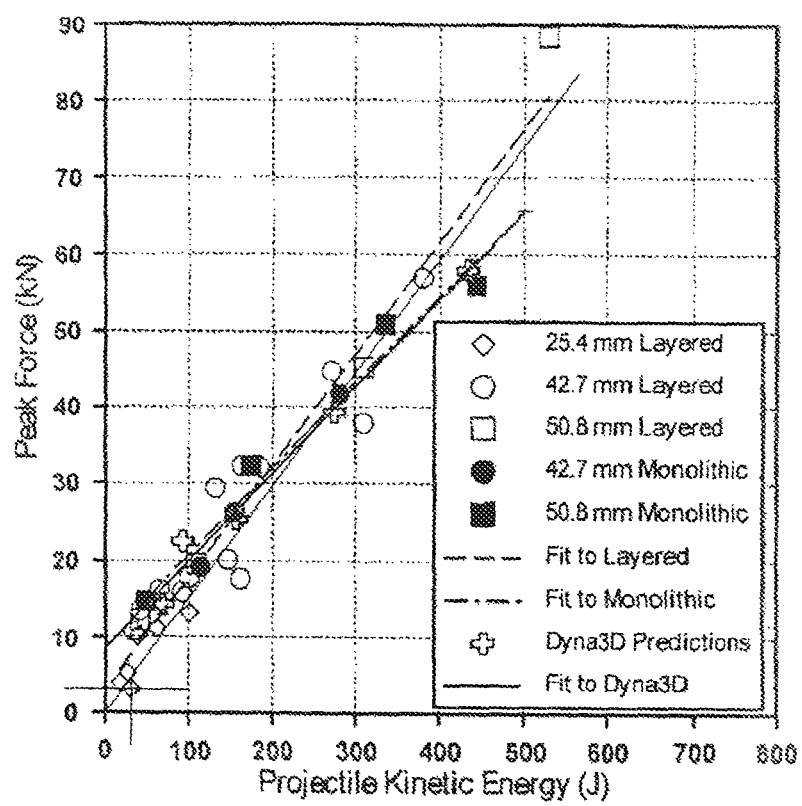
FIG. 5 is a graph illustrating impact force for certain media.

Empirical testing of hailstorm incidents has yielded the data of FIG. 5. Linear regression of the data of FIG. 5 provides a formula for calculating T, the kinetic energy of a hailstorm, shown in Equation 2.

$$F = \frac{3}{20} T \quad (2)$$

Incorporating this expression into Equation 1 yields Equation 3.

$$P = \frac{\frac{3}{20}\left(\frac{1}{2}mv^2\right)}{A} \quad (3)$$

Empirical testing has also shown that a hailstone will generally reach a maximum velocity, measured in m/s, related to its diameter (D) measured in mm according to Equation 4.

$$v = 1.4 D^{0.8} \quad (4)$$

Assuming a spherical hailstone, the mass (m) of the hailstone can be estimated based on the density of ice, as in Equation 5.

$$m = \left[\frac{4}{3}\pi\left(\frac{D}{2}\right)^3\right] 9.167 \times 10^{-7} \frac{\text{kg}}{\text{mm}^3} \quad (5)$$

The impact area of a stone can be estimated according to the equation for an area of a circle that is formed when a sphere intersects a plane, with b as the linear distance of the intersecting plane from the center of the sphere. This is shown in Equation 6.

$$A = \pi\left[\left(\frac{D}{2}\right)^2 - b^2\right] \quad (6)$$

Combining all of the foregoing yields an expression for computing the pressure of impact, measured in kN/mm², with D and B both in mm. This is Equation 7

$$P = \frac{\frac{3}{20}\left(\frac{1}{2}\left[\frac{4}{3}\pi\left(\frac{D}{2}\right)^3\right]\left[9.167 \times 10^{-7} \frac{kg}{mm^3}\right][1.4D^{0.8}]^2\right)}{\pi\left[\left(\frac{D}{2}\right)^2 - b^2\right]} \quad (7)$$

Figure 1:
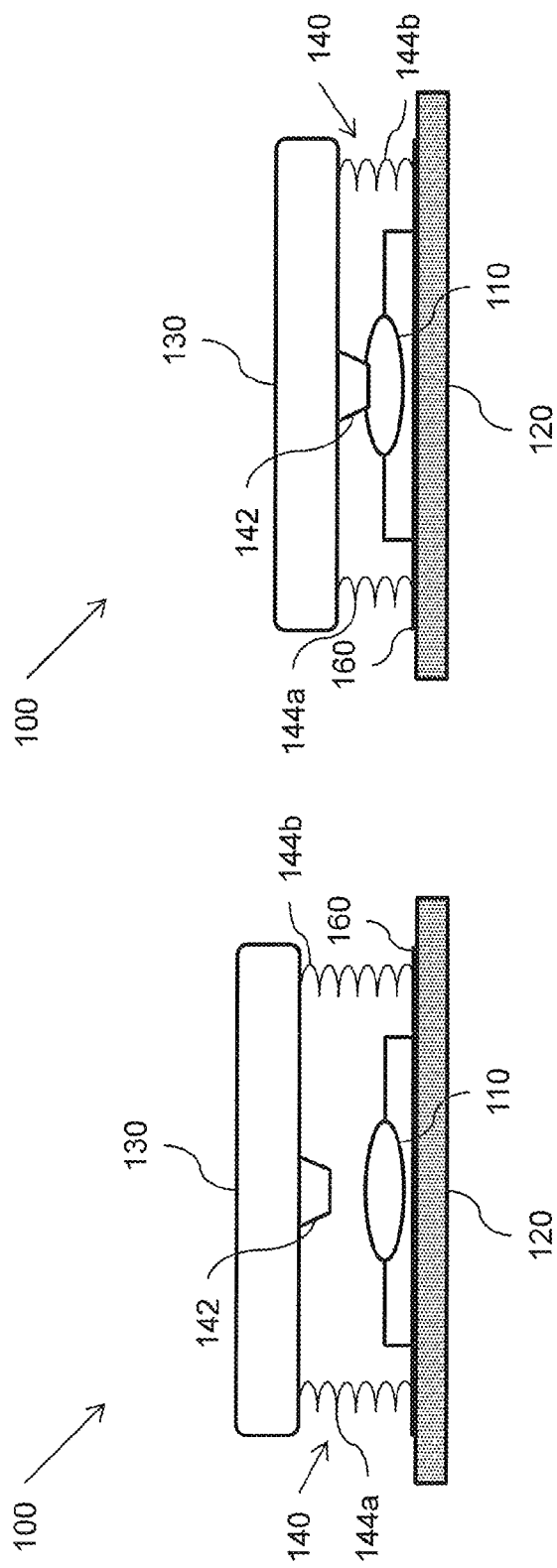
FIGS. 1A-1B are side views of an example impact-resistant surface-mounted roof load sensor system.

FIGS. 1A-B illustrate an example impact-resistant roof sensor system 100. System 100 includes a sensor 110, a protective cover 130, and a load transfer mechanism 150. Sensor 110 may be a piezo-electric sensor, a piezo-resistive sensor, a structural member with strain gauges, or any other appropriate device for sensing a load. In the illustrated example, sensor 110 is mounted to the surface of a roof 120, only a portion of which is illustrated. System 100 may also be mounted in scuppers, downspouts, or any other appropriate roof-related area.

Protective cover 130 is provided to distribute loads and to protect sensor 110 from impacts, such as from hail. Protective cover 130 may be a shield, a plate, a grate, or any other structure for providing impact protection for sensor 110. Protective cover 130 may be made of metal, plastic, ceramic, or any other appropriate material. In particular implementations, protective cover 130 may resist UV degradation.

Protective cover 130 may be of varying sizes, but is typically at least as wide as sensor 110. In particular implementations, protective cover 130 may be approximately 15 cm by 15 cm, while sensor 110 may be approximately 2.5 cm by 2.5 cm. System 100 can be of varying heights, but is typically thin compared to its horizontal dimensions. Additionally, roof drainage may be taken into account in determining the appropriate height for the sensor system. In certain implementations, system 100 may be approximately 2 cm in height.

Load transfer mechanism 140 is adapted to transfer the load on protective cover 130 to sensor 110. In this implementation, load transfer mechanism 144 includes a contact 142 and a number of resilient members 144. Contact 142 is mounted to the bottom of protective cover 130 and is designed to be brought into engagement with sensor 110 so that sensor 110 can sense the movement due to a load and generate a signal indicative of the load. Thus, contact 142 conveys a load incident on protective cover 130 to sensor 110.

In the illustrated implementation, contact 142 is configured so that movement of various portions of protective cover 130 may by conveyed to sensor 110. For example, a load on the left side of protective cover 130 may result in a load being applied to sensor 110 even if no load is being applied to the right side of protective cover 130. Contact 142 may be made of metal, plastic or any other appropriate non-corrosive material.

Resilient members 144 are coupled to cover 130 and a base 160, which may be part of sensor 110 or a housing for system 100. Resilient members 144 function to restore the spatial relationship between protective cover 130 and sensor 110 when no load is being applied to protective cover 130. As illustrated, resilient members 144 are coiled springs. In other implementations, resilient members 144 may be any other resilient members.

In certain implementations, system 100 may be mounted on the surface of roof 120. In other implementations, system 100 may be recessed into a roof, which may assist in drainage. For example, protective cover 110 may be parallel with a roof.

FIG. 1B illustrates system 100 under load. As illustrated, protective cover 130 has been moved towards sensor 110 so that contact 142 engages sensor 110. The movement of protective cover 130 has also caused resilient members 144 compress. Thus, when the load is removed, protective cover 130 may return to the position in FIG. 1A.

System 100 has a variety of features. For example, system 100 allows the load on a roof section to be sensed directly and repeatedly, which can be used to form trends. This may be used to warn of and/or prevent roof failure. Existing roof load systems, on the other hand, tend to be reactive. That is, the roof is already in severe distress before any notification is provided. System 100 may also be protected from damage due to the presence of protective cover 110. In particular implementations, for example, sensor 110 may be protected from impacts of greater than 90 kN/mm³. Additionally, using larger versions of protective cover 130 (e.g., 10 cm-15 cm, or greater) may help to reduce bridging versus smaller versions (e.g., 2 cm). System 100 may be especially useful for relatively flat roofs, but may also be useful for sloped roofs. System 100 may be used for existing roofs or new installations.

Other implementations may have fewer and/or additional components. For example, system 100 may have a housing that surrounds sensor 110, load transmission mechanism 140, and resilient members 144. Support 160 may, for example, form the base of such a housing. In particular implementations, the housing may be hermetically sealed. This may be of importance when some of the components are metal.

In certain implementations, system 100 may include processing and/or communication capabilities. For example, system 100 may include a processor capable of determining a load based on the output from sensor 110. Furthermore, the processor may have the ability to determine whether the load exceeds a predetermined threshold. If the load exceeds the predetermined threshold, the processor may communicate (e.g., by wire or wirelessly) the load, along with any other information (e.g., timestamp) to a remote computer (e.g., server, controller, or collection point).

Figure 2:
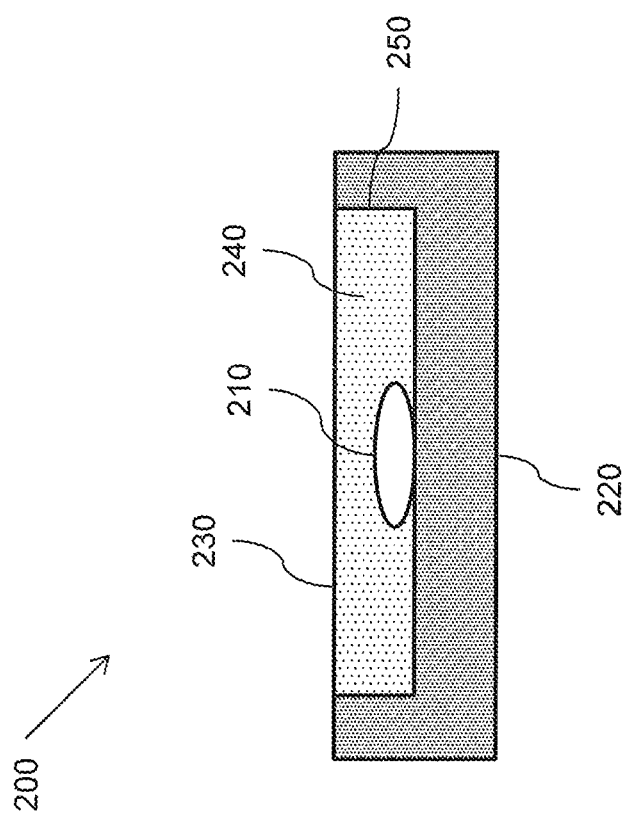
FIG. 2 is a side view of another example impact-resistant surface-mounted roof load sensor system.

FIG. 2 illustrates a second example of an impact-resistant roof sensor system 200. System 200 includes a sensor 210, a protective cover 230, a load transfer mechanism 240, and a housing 250. Sensor 210 may be a piezo-electric sensor, a piezo-resistive sensor, a structural member with strain gauges, or any other appropriate device for sensing a load. In the illustrated example, sensor 210 is recessed in a roof 220, only a portion of which is illustrated. System 200 may also be mounted in scuppers, downspouts, or any other appropriate roof-related area.

Protective cover 230 provides a cover for housing 250 and assists in sealing in load transfer mechanism 240. Protective cover 230 may, for example, be a flexible membrane made of Thermoplastic Polyolefin (TPO), Ethylene Propylene Diene Monomer (EPDM), polyvinyl chloride (PVC), modified bitumen, or any other appropriate material. In certain implementations, protective cover 230 may be a roofing membrane. In particular implementations, protective cover 230 may resist UV degradation.

Protective cover 230 may be of varying sizes, but is typically wider than sensor 210. In particular implementations, protective cover 230 may be approximately 15 cm by 15 cm, while sensor 110 may be 2.5 cm by 2.5 cm. System 200 can be of varying heights, but is typically thin relative to its width. In certain implementations, system 200 may be approximately 2 cm in height.

Load transfer mechanism 240 conveys load incident on protective cover 230 to sensor 210. In this implementations, load transfer mechanism 240 is an incompressible fluid, which may be water, antifreeze, oil or any other appropriate fluid. The incompressible fluid may be varied based on the environments in which system 200 will operate (e.g., hot versus cold). The incompressible fluid also distributes loads applied to protective cover 230 to sensor 210 and protects sensor 210 from direct impacts.

Housing 250 at least partially surrounds load transfer mechanism 240 and acts as a container for it. Housing 250 may be made of metal, plastic, or any other appropriate non-corrosive material. In particular implementations, housing 250 may be hermetically sealed.

System 200 has a variety of features. For example, system 200 allows the load on a roof section to be sensed directly. This may be used to warn of and/or prevent roof failure. Thus, system 200 allows roves to be manage proactively. Moreover, system 200 may be protected from damage due to the presence of protective cover 230 and load transfer mechanism 240. In particular implementations, for example, sensor 210 may be protected from impacts of greater than 90 $kN/mm^3$. Additionally, using larger versions of protective cover 230 (e.g., 10 cm-15 cm, or greater) may help to reduce bridging versus smaller versions (e.g., 2 cm). System 200 may be especially useful for relatively flat roofs, but may also be useful for sloped roofs. System 200 may be used for existing roofs or new installations.

As illustrated, system 200 is recessed into roof 220 with protective cover 230 parallel with a roof line. In other implementations, system 200 may be mounted on roof 220.

In certain implementations, system 200 may include processing and/or communication capabilities. For example, system 200 may include a processor capable of determining a load based on the output from sensor 210. Furthermore, the processor may have the ability to determine whether the load exceeds a predetermined threshold. If the load exceeds the predetermined threshold, the processor may communicate (e.g., by wire or wirelessly) the load, along with any other information (e.g., timestamp) to a remote computer (e.g., server, controller, or collection point).

Figure 3B:
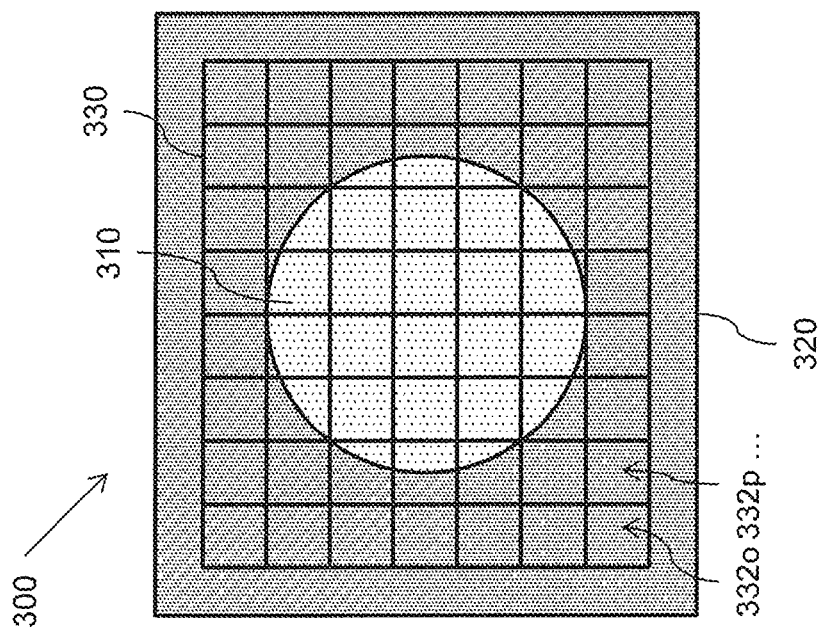
FIGS. 3A-3B are a side view and a top view of an additional example impact-resistant surface-mounted roof load sensor system.
Figure 3A:
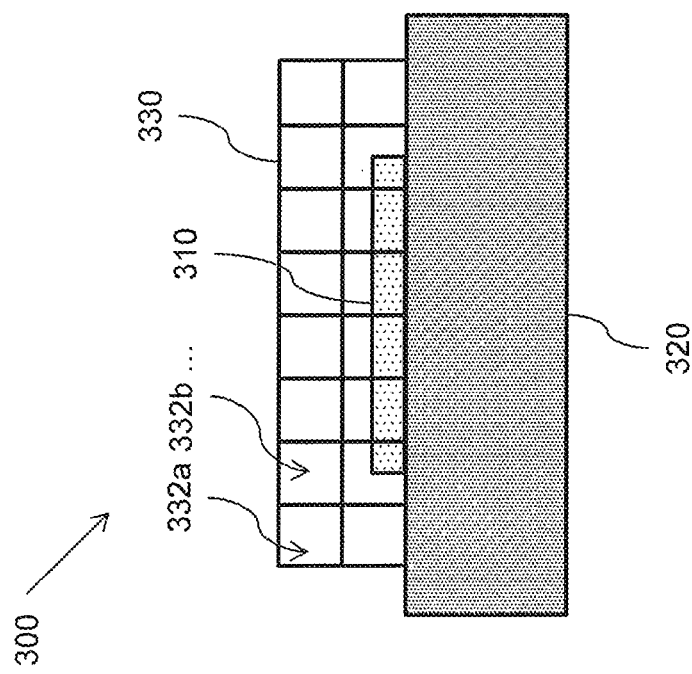

FIGS. 3A-B illustrate another example impact-resistant roof sensor system 300. System 300 includes a sensor 310 mounted to a roof 320. As illustrated, sensor 310 is surrounded by a protective cover 330, which may be mounted to roof 320 or sensor 310. System 300 may also be mounted in scuppers, downspouts, or any other appropriate roof-related area.

Sensor 310 may be a piezo-electric sensor, a piezo-resistive sensor, a structural member with strain gauges, or any other appropriate device for sensing a load. In certain implementations, sensor 310 may have a load transfer mechanism to transfer a load incident on its surface to the actual sensing mechanism.

Protective cover 330 includes a number of apertures 332. Protective cover 330 may, for example, be made of wire, plastic, or any other appropriate material.

Protective cover 330 is adapted to protect sensor 310. For example, protective cover 330 may be designed to prevent larger hailstones or other objects from striking sensor 310. In certain implementations, the width of protective cover 310 may be as small as sensor 310. In other implementations, the width of protective cover 310 may be as large the entire sensing brick, shingle, or otherwise. In certain implementations, protective cover 310 may be around 2 cm inches in height.

Protective cover 330 may also assist in preventing bridging by being made large enough that bridging is not likely to occur over the cage. For example, the cage may be approximately 10-15 cm in width.

Apertures 332 of protective cover 330 may be appropriately sized to allow media (e.g., snow and/or ice) to penetrate the cage. Thus, the load created by such media may be sensed. In particular implementations, apertures 332 may be approximately 1-3 cm on a side, but may be more or less as needed depending on weather in a climate.

In particular implementations, protective cover 330 may heated (e.g., electrically, radiatively, cirulatively, or otherwise) to a temperature sufficiently high to melt snow and/or ice. For example, any temperature that exceeds the melting temperature of ice/snow (e.g., about 39 degrees F.) should suffice. In certain implementations, cage 330 may be heated to a temperature in the range of 60 degrees F. Other temperatures may be used in other implementations. Heating protective cover 330 may allow accumulated snow or ice to melt slowly. Thus, the ice and/or ice may fall through to sensor 310 and the load be sensed.

System 300 has a variety of features. For example, system 300 may allow the load on a roof section to be sensed directly. This may be used to warn of and/or prevent roof failure. Thus, system 200 allows roves to be manage proactively. Moreover, sensor 310 may be protected from damage due to the presence of protective cover 330. In particular implementations, for example, sensor 310 may be protected from impacts of greater than 90 $kN/mm^3$. Additionally, protective cover 330 may prevent bridging, which may allow more accurate readings to be made. System 300 may be especially useful for relatively flat roofs, but may also be useful for sloped roofs. System 300 may be used for existing roofs or new installations.

In certain implementations, system 300 may include processing and/or communication capabilities. For example, system 300 may include a processor capable of determining a load based on the output from sensor 310. Furthermore, the processor may have the ability to determine whether the load exceeds a predetermined threshold. If the load exceeds the predetermined threshold, the processor may communicate (e.g., by wire or wirelessly) the load, along with any other information (e.g., timestamp) to a remote computer (e.g., server, controller, or collection point).

Figure 4:
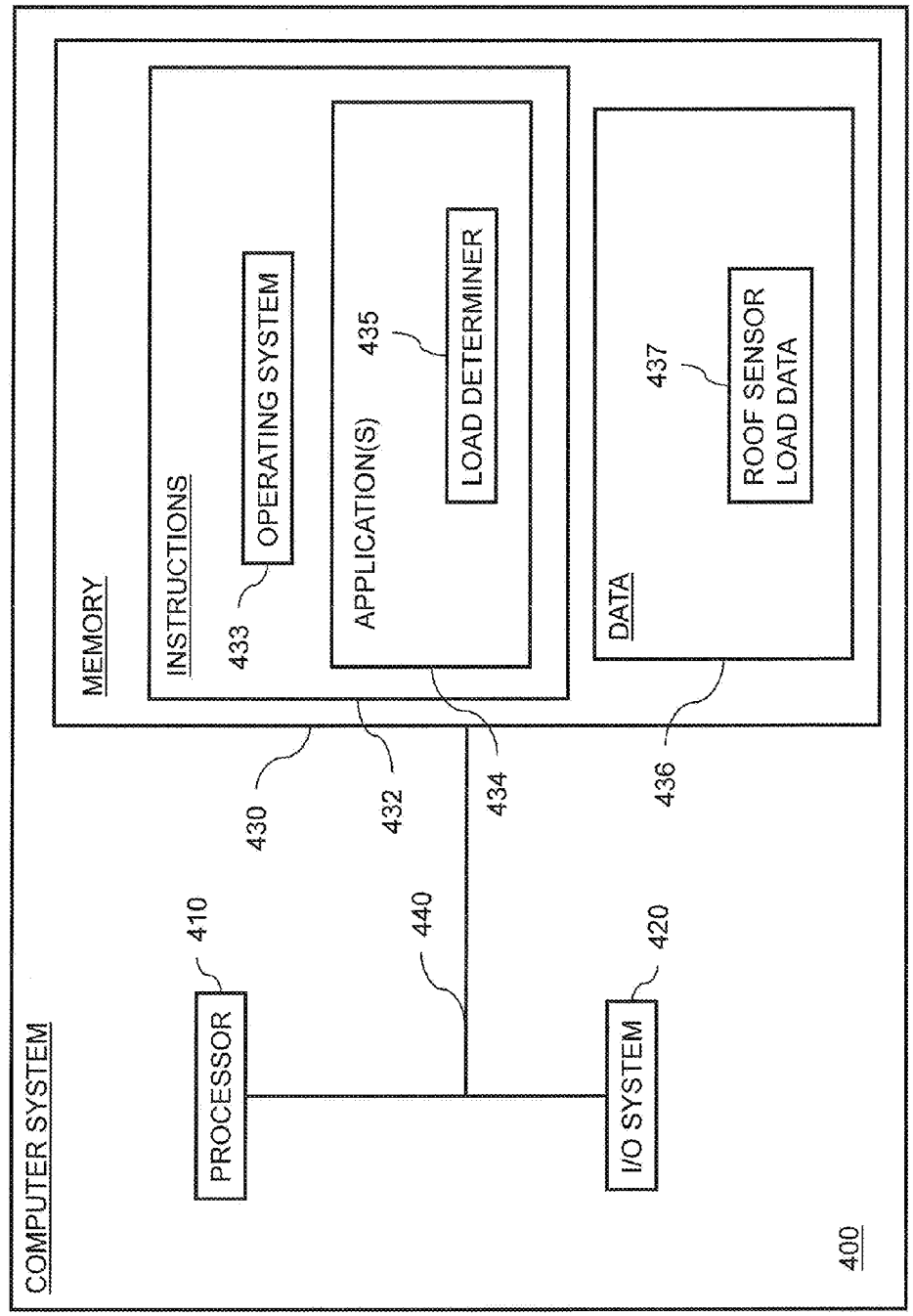
FIG. 4 is a block diagram of an example computer system for a surface-mounted roof load sensor system

FIG. 4 illustrates selected components of an example computer system 400 for determining a roof load. Computer system 400 may, for example, be co-located with a roof-mounted load sensor. System 400 includes a processor 410, an input/output system 420, and memory 430, which are coupled together by a network 440.

Processor 410 typically includes a logical processing unit (e.g., an arithmetic logic unit) that processes data under the direction of program instructions (e.g., from software or firmware). For example, processor 410 may be a microprocessor, a microcontroller, or an application specific integrated circuit. The processor may operate by reduced instruction set computer (RISC) or complex instruction set computer (CISC) principles. In general, the processor may be any device that manipulates data in a logical manner.

Input/output system 420 may include one or more communication interfaces and/or one or more other user interfaces. A communication interface may, for instance, be a network interface card (whether wireless or wireless), a modem, and/or a bus interface (e.g. serial or parallel). Wireless communication techniques include WiFi, Bluetooth, GSM, TDMA, FDMA, and CDMA. A user interface could, for instance, be a user input device (e.g., a keyboard, a keypad, a touchpad, a stylus, a mouse or a microphone) or a user output device (e.g., a monitor, a display, or a speaker). In general, input-output system 120 may be any combination of devices by which a computer system can receive and output data.

Memory 430 may, for example, include random access memory (RAM), read-only memory (ROM), flash memory, and/or disc memory. Moreover, some of memory may be encoded in hardware (e.g., on processor 410). Various items may be stored in different portions of the memory at various times. Memory 430, in general, may be any combination of devices for storing data.

Memory 430 includes instructions 432 and data 436. Instructions 432 include an operating system 433 (e.g., Windows, Linux, or Unix) and applications 434, which include a load determiner 435. Data 436 includes the data 437 from a roof-mounted load sensor.

Network 440 is responsible for communicating data between processor 410, input/output system 420, and memory 430. Network 440 may, for example, include a number of different types of busses (e.g., serial, parallel, thunderbolt, and lightning connectors).

In certain modes of operation, computer system 400 may receive load data 437 from a roof-mounted load sensor through I/O system 420. The data may arrive in an analog or digital format. Processor 410 may then analyze the data to determine the load for the associated roof sensor. Processor 410 may then communicate the determined load to a remote device using I/O system 420. The remote device may be responsible for determining whether the load is within bounds and generate a notification if discrepancies are found.

System 400 may be managed by a variety of techniques. For example, it may be managed directly (e.g., through a user interface) or remotely (e.g., through a smartphone application or a Web interface).

The terminology used herein is for the purpose of describing particular implementations only and is not intended to be limiting. As used herein, the singular form "a", "an", and "the" are intended to include the plural forms as well, unless the context clearly indicates otherwise. It will be further understood that the terms "comprises" and/or "comprising," when used in the this specification, specify the presence of stated features, integers, steps, operations, elements, and/or components, but do not preclude the presence or addition of one or more other features, integers, steps, operations, elements, components, and/or groups therefore.

The corresponding structure, materials, acts, and equivalents of all means or steps plus function elements in the claims below are intended to include any structure, material, or act for performing the function in combination with other claimed elements as specifically claimed. The description of the present implementations has been presented for purposes of illustration and description, but is not intended to be exhaustive or limited to the implementations in the form disclosed. The implementations were chosen and described in order to explain the principles of the disclosure and the practical application and to allow others of ordinary skill in the art to understand the disclosure for various implementations with various modifications as are suited to the particular use contemplated.

A variety of roof load measurement systems have been described, and several others have been mentioned or suggested. Additionally, those of skill in the art will readily recognize that a variety of additions, deletions, substitutions, and/or modifications may be made while still achieving roof load measurement. Thus, the protected subject matter should be judged based on the following claims, which may encompass one or more aspects of one or more implementations.

The invention claimed is:

1. An impact-resistant surface-mounted roof sensor system, comprising:
    a sensor adapted to sense a force load incident thereon, the sensor having a width;
    a protective cover configured to span at least the width of the sensor and adapted to withstand high-energy impacts from dense water-based media and a direct incident force load from water-based media; and
    a load transfer mechanism adapted to mechanically transfer a force load applied on the protective cover to the sensor.

2. The sensor system of claim 1, wherein the sensor comprises a piezo-electric device.

3. The sensor system of claim 1, wherein:
    the protective cover comprises a shield; and
    the load transfer mechanism comprises a resilient member.

4. The sensor system of claim 1, wherein:
    the protective cover comprises a flexible membrane; and
    the load transfer mechanism comprises an incompressible fluid.

5. The sensor system of claim 1, wherein the protective cover comprises a shield with a number of apertures to block larger water-based media but allow smaller water-based media to pass.

6. The sensor system of claim 5, wherein the protective cover is configured to prevent bridging by surrounding water-based media.

7. The sensor system of claim 1, further comprising a computer system co-located with the sensor to determine the force load on the protective cover and to determine whether the force load exceeds a threshold and communicate the force load to a remote computer if the force load exceeds the threshold.

8. The sensor system of claim 1, wherein the protective cover is configured to prevent bridging by surrounding water-based media.

9. The sensor system of claim 1, wherein the protective cover is adapted to protect from impacts of at least 90 kN/mm$^3$.

10. The sensor system of claim 1, wherein dense water-based media comprises hail.

11. The sensor system of claim 1, wherein the sensor system is adapted to mount to a top surface of a roof.

12. The sensor system of claim 7, wherein the computer also communicates additional measurement data to the remote computer.

\* \* \* \* \*